US009771156B2

United States Patent
Brownjohn et al.

(10) Patent No.: US 9,771,156 B2
(45) Date of Patent: Sep. 26, 2017

(54) FLEXIBLY ADJUSTABLE PASSENGER SEAT DEVICE FOR A VEHICLE CABIN

(71) Applicant: Airbus Operations GmbH, Hamburg (DE)

(72) Inventors: Nicholas Brownjohn, Buxtehude (DE); Thomas Vogt, Ludwigsburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/142,236

(22) Filed: Apr. 29, 2016

(65) Prior Publication Data
US 2016/0318611 A1   Nov. 3, 2016

(30) Foreign Application Priority Data
Apr. 29, 2015 (EP) ..................................... 15165764

(51) Int. Cl.
| | | |
|---|---|---|
| *B60N 2/01* | (2006.01) | |
| *B60N 2/02* | (2006.01) | |
| *B60N 2/16* | (2006.01) | |
| *B64D 11/06* | (2006.01) | |

(52) U.S. Cl.
CPC ...... *B64D 11/0693* (2013.01); *B64D 11/0639* (2014.12); *B64D 11/0644* (2014.12)

(58) Field of Classification Search
CPC ............ B64D 11/0639; B64D 11/0693; B64D 11/0644
USPC ........ 297/232–237, 248, 257, 312, 105, 338
See application file for complete search history.

(56) References Cited

U.S. PATENT DOCUMENTS

| | | | | | |
|---|---|---|---|---|---|
| 493,441 | A | * | 3/1893 | Munz ...................... | A47C 3/26 297/233 X |
| 1,063,809 | A | * | 6/1913 | Lawson .................. | A47C 7/024 297/233 |
| 1,976,326 | A | * | 10/1934 | Carlton .................. | A47C 7/405 297/312 |
| 3,145,052 | A | * | 8/1964 | Morgan ............. | B64D 11/0693 297/233 X |
| 5,180,120 | A | * | 1/1993 | Simpson ............ | B64D 11/0693 297/232 X |
| 5,660,437 | A | * | 8/1997 | Bauer .................. | B60N 2/3065 297/237 X |
| 7,562,934 | B2 | * | 7/2009 | Swan .................... | B60N 2/4492 297/233 |
| 7,578,551 | B2 | * | 8/2009 | Linero ............... | B64D 11/0693 297/234 X |
| 7,716,797 | B2 | * | 5/2010 | Kismarton ............. | B64D 11/06 297/232 X |

(Continued)

FOREIGN PATENT DOCUMENTS

WO         2014128102 A1    8/2014

*Primary Examiner* — Rodney B White
(74) *Attorney, Agent, or Firm* — Lorenz & Kopf, LLP

(57) ABSTRACT

A passenger seat device for a vehicle cabin comprises a front end and a rear end, a backrest arranged at the rear end, a plurality of seat surface segments extending from the rear end to the front end and a seat frame for carrying the seat surface segments and the backrest. The seat surface segments are arranged in a side-by-side relationship and constitute a seat surface and the seat surface segments are individually adjustable between at least two different vertical positions relative to the seat frame. The passenger seat device may flexibly seat passengers with different constitutions.

17 Claims, 2 Drawing Sheets

(56) References Cited

U.S. PATENT DOCUMENTS

| | | | | | |
|---|---|---|---|---|---|
| 7,717,519 | B2* | 5/2010 | Kismarton | ............. | B64D 11/06 297/232 X |
| 8,011,713 | B2* | 9/2011 | Schlamann | ............. | B60N 2/01 297/236 X |
| 8,118,359 | B2* | 2/2012 | Kyogoku | ............ | B60N 2/3038 297/105 X |
| 8,251,427 | B2* | 8/2012 | Lindsay | ................ | B60N 2/062 297/234 X |
| 8,308,238 | B2* | 11/2012 | Imaoka | ................ | B60N 2/688 297/105 |
| 8,590,126 | B2* | 11/2013 | Kismarton | ............... | A47C 5/00 297/232 X |
| 8,708,410 | B2* | 4/2014 | Scott | ...................... | B64D 11/06 297/234 |
| 8,733,829 | B2* | 5/2014 | Liu | ....................... | A47C 7/543 297/119 |
| 8,936,306 | B2* | 1/2015 | Liu | ......................... | A47C 7/70 297/233 X |
| 8,967,723 | B2* | 3/2015 | Boren | .................... | B64D 11/06 297/233 X |
| 9,359,079 | B2* | 6/2016 | Scott | ................. | B64D 11/0601 |
| 2012/0299346 | A1* | 11/2012 | Kneller | ................. | B60N 2/002 297/232 |

\* cited by examiner

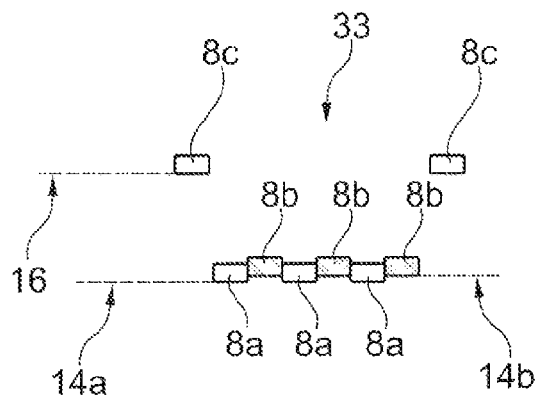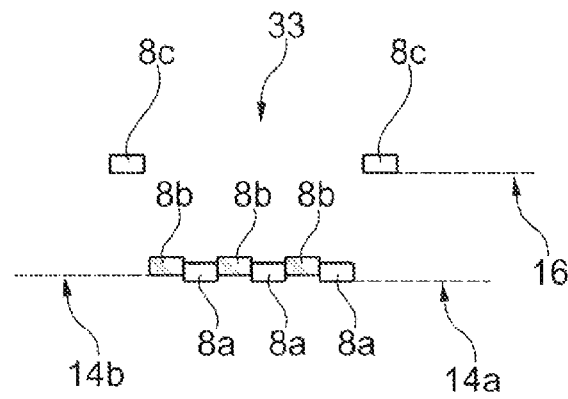
Fig. 4a  Fig. 4b
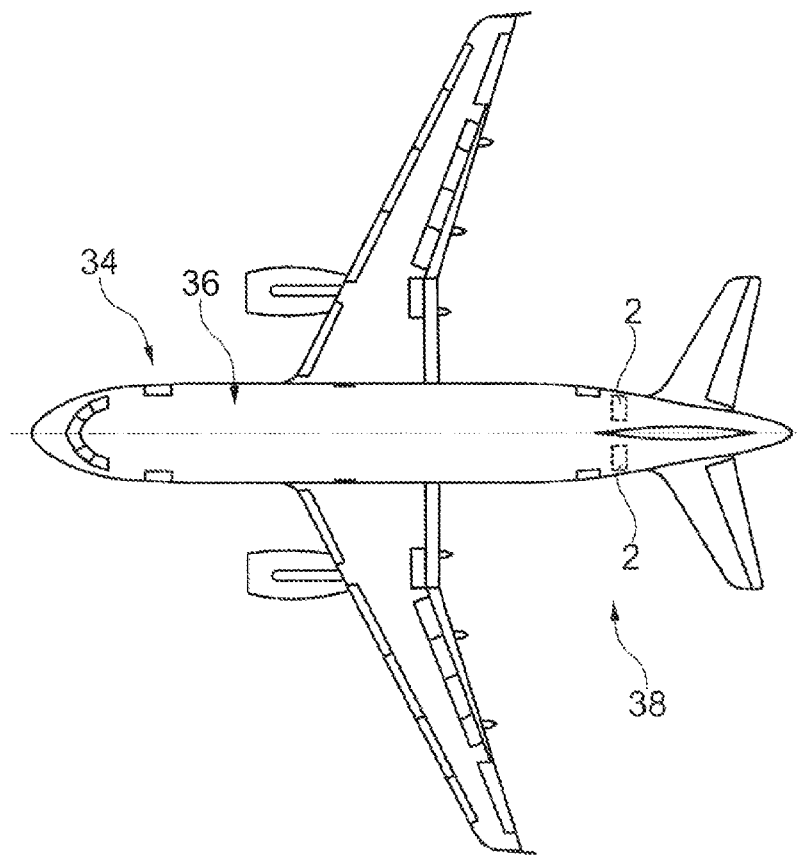
Fig. 5

FLEXIBLY ADJUSTABLE PASSENGER SEAT DEVICE FOR A VEHICLE CABIN

CROSS-REFERENCE TO RELATED APPLICATION

This application claims priority to European Patent Application No. 15165764.0, filed Apr. 29, 2015, which is incorporated herein by reference in its entirety.

TECHNICAL FIELD

The embodiments described herein relate to a passenger seat device for a vehicle cabin and a vehicle having a cabin equipped with at least one such passenger seat device.

BACKGROUND

In addition, other objects, desirable features and characteristics will become apparent from the subsequent summary and detailed description, and the appended claims, taken in conjunction with the accompanying drawings and this background.

Passenger seats in vehicle cabins often comprise the same dimensions, e.g. a width, throughout a certain cabin class. If passengers do not fit into such a passenger seat, an armrest arranged between two adjacent passenger seats may be swiveled away to allow slightly more room for the passenger. Resultantly, over-sized passengers require over-sized passenger seats to be seated comfortably, or, as an alternative, two adjacent seats In the state of the art, also special reconfigurable passenger bench seats are known, which comprise a seat belt system with a plurality of different configurations providing a different number of passenger seat belts. For example, this is disclosed in WO 2014/128102 A1.

SUMMARY

It may be advantageous and/or desired to provide at least a small number of passenger seats in a cabin of a vehicle that more flexibly allow to seat passengers with a non-average constitution, such as obese passengers. In the following, some passengers may be referred to as over-sized passengers, which are wider than passengers with an average constitution. On the other hand, it may desirable to provide a flexible passenger seat that allows to seat children comfortably with a substantially increased efficiency in terms of space usage. Resultantly, it is an object to provide a passenger seat, which may be adapted to seat passengers with different constitutions more flexibly and in a space efficient manner.

A passenger seat device for a vehicle cabin is proposed, the device comprising a front end and a rear end, a backrest arranged at the rear end, a plurality of seat surface segments extending from the rear end to the front end and a seat frame for carrying the seat surface segments and the backrest. The seat surface segments are arranged in a side-by-side relationship and constitute at least one seat surface. The seat surface segments are individually adjustable between at least two different vertical positions relative to the frame.

With such an advantageous passenger seat device other specialized passenger seats or seat arrangements are not necessary any more, as the passenger seat device provides an extensive flexibility for seating passengers with different constitutions. The core components of such a passenger seat device are explained in the following.

First of all, the seat frame provides a rigid base for the passenger seat device, which is placeable in different positions of the vehicle cabin, such as in floor-mounted seat rails under use of suitable locking means. The seat frame may comprise a set of interconnected framework elements of similar or different shapes or may be manufactured as a single, integral component through casting and/or welding. Commonly and particularly in installations in an aircraft cabin, the seat frame comprises an extremely rigid structure, which is able to receive a multiplicity of the occurring static loads from a passenger and to introduce it into a structural part of the vehicle.

In this context, the vehicle may be any vehicle capable of transporting passengers, such as a road vehicle, a rail vehicle, a watercraft or an aircraft, which may include a fixed wing or a rotating wing aircraft. It is not to be understood as limiting to focus the embodiment on a fixed wing aircraft when discussing exemplary embodiments in the following.

Similar to common passenger seats or passenger bench seats, the passenger seat device comprises a front end and a rear end, which delimit the spatial extensions of the passenger seat device in a horizontal plane parallel to a floor, on which the passenger seat device is mounted. A passenger, who sits on the seat surface segments, rests with the back on the backrest, while the front of the passenger's body points to the front end.

The seat surface segments are horizontally arranged components, which are supported on the seat frame and arranged in a side-by-side relationship. This means, that in a substantially horizontal plane, which is preferably parallel to the floor or at a slight angle thereto, a plurality of seat surface segments are positioned one next to the other. If all seat surface segments are arranged at the same vertical position, they constitute a closed surface.

A core aspect of an embodiment lies in the ability of the seat surface segments to be individually and independently adjusted to different vertical positions relative to the seat frame, i.e. adjacent seat surface segments are positionable in different vertical positions. Thereby, a first group of neighboring seat surface segments may be created, which comprises a common vertical position, while a single neighboring seat surface segment comprises another, particularly higher, vertical position and thereby acting as an armrest. An additional, second group of neighboring seat surface segments may be created, which extends on another side of the dedicated armrest and which comprises the same vertical position as the first group. Resultantly, two different seat areas are created, which are separated through an armrest.

Consequently, the passenger seat device may very flexibly be adjusted to different passenger constellations. The total number of passengers, which may be seated on the passenger seat device, depends on the constitutions of the respective passengers, the width of the seat surface segments and the total width of the passenger seat device, which in turn depends on the available space inside the cabin.

The width of the seat surface segments may be based upon a common width of an armrest, which commonly lies in a range of just below 2 inches to just above 3 inches. For the sake of simplification, the width of the seat surface segments may also be larger, which allows to reduce potentially required individual arresting or locking means for the seat surface segments.

The total width of the passenger seat device may depend on further options and in particular the available space inside the respective vehicle cabin. For example, in a single aisle aircraft, commonly two lateral sections with mostly three and in some regions two passenger seats are used. For example, in a tail region of the aircraft cabin, two adjacent passenger seats may be a maximum, while in the remaining section three passenger seats are common. In wider aircraft cabins having two aisles, groups of four passenger seats may be arranged in a center region. Hence, it is conceivable that the passenger seat device, which should be installable in a common vehicle cabin and particularly in a common aircraft cabin, may comprise a width comparable or equal to a two-aircraft passenger seat group or groups with three or four passenger seats.

While seating over-sized passengers will lead to a reduced number of passengers to be seated on the passenger seat device, this will be the opposite with children to be seated on the passenger seat device. The passenger seat device according to an embodiment provides an extremely flexible way of seating passengers in a vehicle cabin without requiring additional specialized seats for children or over-sized passengers. At the same time, the variety of parts for equipping the vehicle cabin can be reduced.

In an advantageous embodiment, the seat surface segments are lockable in different vertical positions. It is conceivable that the seat surface segments, e.g. each seat surface segment, comprise a release means that allows a user to release the seat surface segments from a locked state, i.e. to unlock the respective seat surface segment and to alter its position subsequently. Preferably, the different vertical positions are limited to exactly two or three different vertical positions, thereby allowing to extend or delimit a seat surface, or to provide an armrest in a fixed position or in one of two different armrest positions. The release means may include a button, a lever, a knob or another element couplable with a lock, so as to selectively unlock the respective seat surface segment. The locking function is particularly useful if children use the passenger seat device, as their weight may not be sufficient for moving the seat surface segments into the use positions properly or for safety reasons.

It may also be advantageous if locked seat surface segments comprise a release means that is couplable with a control means arranged remotely from the respective passenger seat device. This allows to override or disable the locking function e.g. by a cabin crew. This may most conveniently be realized through electrical means, but any other means that avoid crew members having to go to each passenger seat device and make manual changes is desirable.

The locking means may in turn be realized through a variety of different techniques. For example, each seat surface segment may be supported on a vertical scissor mechanism, which comprises at least one pair of crossed levers, wherein an end of one of the levers may slide in a guide extending along a seat surface segment. The slidable end may be releasably arrestable to lock and unlock the vertical position of the respective seat surface segment. As an alternative, the seat surface segment may simply be insertable into one of a set of recesses or holes arranged at different vertical positions in the backrest, wherein a dedicated end or part of the respective seat surface segment comprises a form-fit means that is releasably lockable into the recesses or holes.

Still further, each seat surface segment may comprise a vertical, rod-like element with a plurality or a series of recesses disposed along the rod-like element that interlock with a corresponding locking means in the seat frame. Depending on which recess interlocks with the seat frame, a different vertical position of the respective seat surface segment results.

However, all other possible techniques may be used for interlocking seat surface segments and the seat frame, for example all known mechanisms used for vertically adjustable armrests in office chairs.

In another advantageous embodiment, the seat surface segments are spring-loaded in a vertical, upward direction, such that they are lowered from a neutral position into a use position once a passenger sits down on the seat device. In the use position, the seat surface segments should automatically latch or lock, such that the achieved positions of the seat surface segments are maintained even if the passenger leaves the passenger seat device. This greatly reduces the effort for adjusting the dedicated seat surface constellation manually.

However, depending on the desired vertical position of armrests as well as a tolerable neutral position for the seat surface segments, it may be required to slightly adjust the vertical positions of the armrests to a more upward position. This may also be conducted by the seated passengers themselves, as their dedicated seating areas are already adjusted. If the neutral position of the seat surface segments is excessive, it would be rather cumbersome to reach the seat surface segments for the passengers.

In a further exemplary embodiment, the backrest comprises a plurality of backrest segments, which are arranged in a side-by-side relationship corresponding to the seat surface segments. The backrest comprises a swiveling mechanism that allows to move the backrest from a neutral position into at least one backswept position. Preferably, the swiveling mechanism is coupled with the seat surface segments in such a way, that only a group of backrest segments is swivable when a passenger on corresponding seat surface segments activates the swiveling mechanism.

Still further, the passenger seat devices advantageously comprises a plurality of seat belt anchor points, which are associated with individual seat surface segments. The seat belt anchor points may be arranged along the rear end of the passenger seat device on the backrest or at rear ends of the seat surface segments. The seat belt anchor points allow to easily fasten seat belts at different positions, while the seat belts extend over different lengths, depending on the respective passenger.

In a further exemplary embodiment, seat surface segments associated with one passenger, may comprise two groups of seat surface segments, wherein a first group of seat surface segments comprises a lower vertical use position than a second group of seat surface segments. The vertical use positions of the seat surface segments of the first group and of the second group may be swapped selectively, periodically or in an alternating manner when loaded. As dedicated seating points change for the respective passenger, the comfort is improved. It is conceivable that this process is time-controlled, such that after a defined time, the position of the seat surface segments associated with the first group and the second group, respectively, change. Still further, this function may be disableable or initatable by a passenger on the respective seating area, e.g. through a mechanical means or an electric means controlled through a personal control interface, which may be a separate component or which may be integrated into a personal in-flight entertainment screen, in case the passenger finds it unpleasant.

In a preferred embodiment, each seat surface segment comprises a maximum width of 10 inches. On the one hand, this allows to maintain the high flexibility, as the grid size is small enough to provide a plurality of different configurations for passengers with different constitutions. On the other hand, the larger the width of the seat surface segments is chosen, the lesser the effort for latching/locking means, seat belt anchor points and other peripheral elements is. A 10 inch wide seat surface segment would, furthermore, provide a comfortable armrest for two adjacently seated passengers.

Still further, the total width of the passenger seat device is at least 30 inch. In this setup, the passenger seat device may be able to seat two children or one over-sized passenger. A passenger seat device with such a minimum width may be placed in positions, where usually a two or three abreast seat would not be installable, e.g. due to space constraints. However, if the total width of the passenger seat is larger, such as 34 inches or more, many further configurations are possible. In general it is conceivable to provide a passenger seat device having a width comparable to a common double seat, such as 34 inches, 36 inches or slightly more, which may be able to seat 3 children or provide a single wide seat for a large adult.

The installation position for a passenger seat device according to the embodiments may be chosen from a plurality of different positions. However, it may be intended to provide only a limited (small) number of these to provide the possibility to accommodate over-sized passengers or families with several children. It is conceivable that placing the passenger seat device near cabin doors is advantageous.

It is advantageous if the individual seat surface segments are parallelly shiftable, i.e. each of the adjustable seat segment is capable of changing a vertical position such that a seat segment in a first vertical position is substantially parallel to the same seat segment in a second vertical position. Hence, the individual seat segments are entirely movable between different vertical positions.

The embodiments also relate to a vehicle comprising a cabin with a plurality of installed passenger seats and at least one such passenger seat device according to the above.

This may particularly be advantageous if the vehicle is an aircraft.

BRIEF DESCRIPTION OF THE DRAWINGS

The various embodiments will hereinafter be described in conjunction with the following drawing figures, wherein like numerals denote like elements, and:

FIGS. 4A and 4B show front views of a seating area with lowered seat surface segments in two slightly different use positions.

FIG. 5 show an aircraft having a cabin with a plurality of passenger seats and exemplarily two passenger seat devices.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
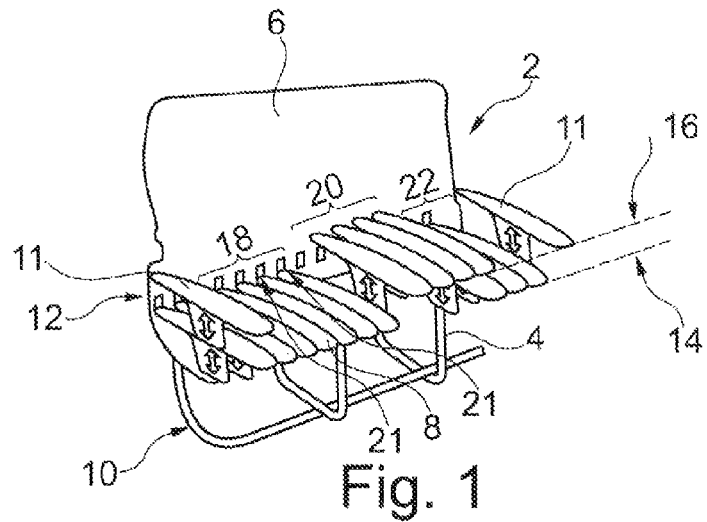
FIG. 1 shows the passenger seat device in a first exemplary embodiment with a first exemplary configuration.

FIG. 1 shows a passenger seat device 2 comprising a seat frame 4, a backrest 6 and a plurality of seat surface segments 8, which are positioned in a side-by-side relationship and extend from a front end 10 to a rear end 12 of the seat device 2. Exemplarily, the passenger seat device 2 comprises the shape of a passenger bench seat that would be able to seat a plurality of passengers.

The seat surface segments 8 are individually adjustable in a vertical direction between at least a use position 14 and an armrest position 16, which may also be considered a neutral position, wherein the use position 14 stands for a position nearer to the seat frame 4 and wherein the armrest position 16 stands for a higher vertical position of the respective seat surface segment 8, which allows to use the respective seat surface segment 8 as an armrest. Resultantly, different arrangements of higher or lower seat surface segments 8 can be created, leading to the creation of a plurality of different seating areas 18, 20 and 22. Outer seat surface segments 8 may be used as lateral armrests 11. However, as illustrated in FIGS. 2 and 3, the use of fixed lateral armrests may also be possible.

This allows to flexibly seat passengers with different constitutions on the passenger seat device 2 in a space efficient manner. The above shown first seating area 18 comprises a relatively large number of seat surface segments 8 in a use position 14, thereby allowing to seat an over-sized passenger. In the second seating area 20, a small number of seat surface segments 8 are placed in an armrest position 16, which provides a child booster seat. Still further, the third seating area 22 comprises a relatively low number of seat surface segments 8 in a use position 14, which serves as a passenger seat for a slim passenger. All lowered seat surface segments 8 are locked or latched in the use position 14, such that the arrangement is maintained until the seat surface segments 8 are released into their armrest or neutral positions 16.

For being able to provide a suitable set of seat belts, a plurality of seat belt anchor points 21 is arranged along the rear end 12, e.g. on the backrest 6 or the individual seat surface segments 8. Depending on the passenger seated on the respective seating areas 18, 20 and 22, narrow or longer seat belts may easily be installed between the available seat belt anchor points 21.

Figure 2:
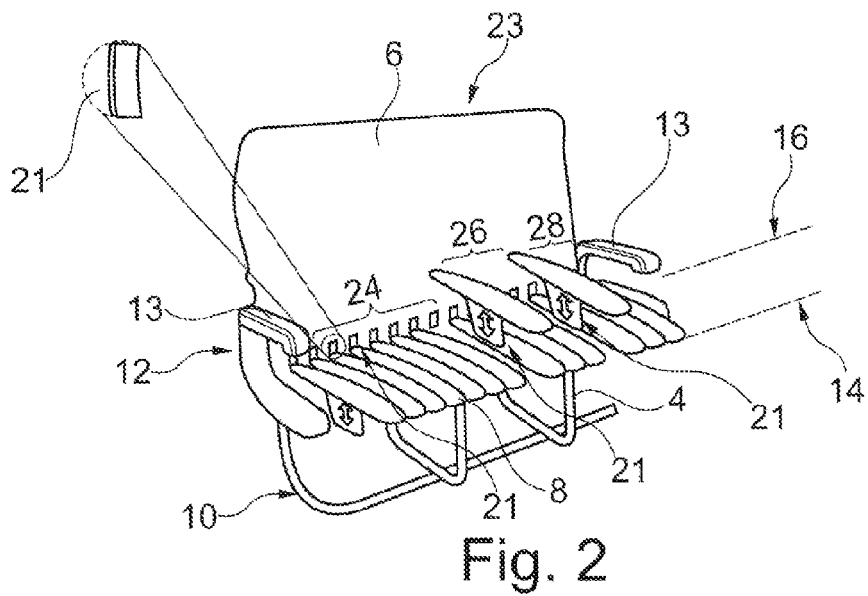
FIG. 2 shows the passenger seat device in a second exemplary embodiment with a first exemplary configuration.
Figure 3:
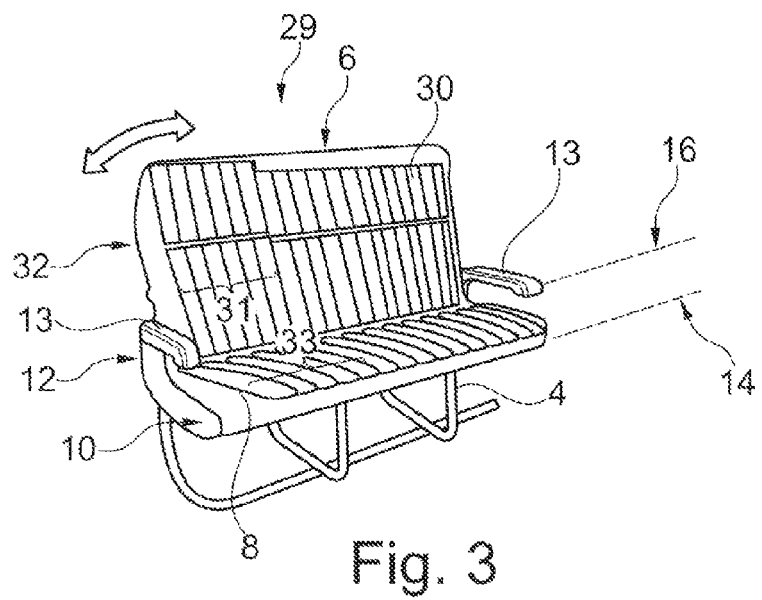
FIG. 3 shows a passenger seat device with a segmented backrest.

FIG. 2 shows another example of a passenger seat device 23, which is adjusted to different seating areas 24, 26 and 28. The seating areas 24, 26, and 28 are not drawn to scale, provide a merely schematic representation of a setup that clearly differs from a normal setup and may exemplarily be dimensioned so as to seat an over-sized passenger and two slim passengers or children. As illustrated, the passenger seat device 23 exemplarily comprises outer armrests 13 with a fixed position. The armrests 13 may be designed equal or similar to common armrests and may optionally be equipped with a swiveling mechanism.

As indicated in FIG. 3, the backrest 6 of a passenger seat device 29 may comprise a plurality of backrest segments 30, which are arranged adjacent to each other and correspond to the seat surface segments 8. The backrest segments 30 may be coupled with a seat swiveling mechanism 32 (not depicted in detail) allowing the backrest segments 30 to swivel from an upright, neutral position into backswept positions, as indicated by a double-headed arrow. The swiveling mechanism 32 is able to allow only those backrest segments 30 to be swivable, which correspond to the seat surface segments 8 on which the passenger sits, who initiates the seat swiveling mechanism 32. The swiveling mechanism 32 should be couplable with the seat surface segments 8 in such a way, that only a group of backrest segments 30 is swivable when a passenger on a corresponding group of seat surface segments 8 activates the swiveling mechanism 32.

In FIGS. 4A and 4B, a front view of two different groups of seat surface segments 8a and 8b, respectively, is shown. The first group exemplarily comprises all odd numbered seat surface segments 8a, while the second group comprises all even numbered seat surface segments 8b. The seat surface segments 8a of the first group are shown in a slightly lower use position 14A than the vertical use position 14B of the seat surface segments 8b of the second group. These two use positions 14A, 14B may be a first and a second use position, wherein the upper surface segments 8b carry the majority of the weight of the passenger. It may improve the comfort of the passenger if the two different use positions are switched selectively, periodically or in an alternating manner, such that sometimes the seat surface segments 8a of the first group and sometimes the other seat surface segments 8b of the second group carry the majority of the weight. This may be conducted through spring and damper mechanisms or through a plurality of dedicated actuators. Delimiting a seating area 33 constituted by the seat surface segments 8a and 8b, two single seat surface segments 8c are arranged in the armrest position 16.

Lastly, FIG. 5 shows an aircraft 34 having a cabin 36 with a set of passenger seats and exemplarily two passenger seat devices arranged in a rear section 38.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A passenger seat device for a vehicle cabin, the device comprising:
   a front end and a rear end,
   a backrest arranged at the rear end,
   a plurality of seat surface segments extending from the rear end to the front end, and
   a seat frame for carrying the seat surface segments and the backrest,
   wherein the seat surface segments are arranged in a side-by-side relationship and constitute a seat surface,
   wherein the seat surface segments are individually adjustable between at least two different vertical positions relative to the seat frame, and
   wherein the seat surface segments are spring-loaded in a vertical, upward direction, such that they are lowered from a neutral position into a use position when a passenger sits down on the passenger seat device.

2. The passenger seat device of claim 1,
   wherein the seat surface segments are lockable in different vertical positions, and
   wherein the seat surface segments comprise release means for releasing the seat surface segments from a locked state.

3. The passenger seat device of claim 2,
   wherein the release means is configured to couple with a control means arranged remotely from the respective passenger seat device.

4. The passenger seat device of claim 1,
   wherein the seat surface segments automatically arrest in the use position.

5. The passenger seat device of claim 1,
   wherein the backrest comprises a plurality of backrest segments, which are arranged in a side-by-side relationship corresponding to the seat surface segments.

6. The passenger seat device of claim 1,
   comprising a plurality of seat belt anchor points, which are associated with individual seat surface segments.

7. The passenger seat device of claim 1, comprising two groups of seat surface segments,
   wherein a first group of seat surface segments comprises a lower vertical use position than a second group of seat surface segments,
   wherein the vertical use positions of the seat surface segments of the first group and of the second group are swapped selectively, periodically or in an alternating manner.

8. The passenger seat device of claim 7,
   wherein the passenger seat device is configured to accommodate disabling or initiating of swapping the vertical use positions by a passenger on the respective seating area,
   wherein each seat surface segment comprises a maximum width of substantially 10 inch.

9. The passenger seat device of claim 7,
   wherein the passenger seat device is configured to accommodate disabling or initiating of swapping the vertical use positions by a passenger on the respective seating area.

10. The passenger seat device of claim 1,
    wherein each seat surface segment comprises a maximum width of substantially 10 inch.

11. The passenger seat device of claim 1,
    wherein the total width of the passenger seat device is at least 25 inch.

12. The passenger seat device of claim 1, wherein the individual seat surface segments are shiftable in parallel.

13. A vehicle comprising:
    a cabin with a plurality of installed passenger seats, and
    at least one passenger seat device, the seat device comprising:
      a front end and a rear end,
      a backrest arranged at the rear end,
      a plurality of seat surface segments extending from the rear end to the front end, and
      a seat frame for carrying the seat surface segments and the backrest,
    wherein the seat surface segments are arranged in a side-by-side relationship and constitute a seat surface,
    wherein the seat surface segments are individually adjustable between at least two different vertical positions relative to the seat frame, and
    wherein the seat surface segments are spring-loaded in a vertical, upward direction, such that they are lowered from a neutral position into a use position when a passenger sits down on the passenger seat device.

14. The vehicle of claim 13, wherein the vehicle is an aircraft.

15. A passenger seat device for a vehicle cabin, the device comprising:
- a front end and a rear end,
- a backrest arranged at the rear end,
- a plurality of seat surface segments extending from the rear end to the front end, and
- a seat frame for carrying the seat surface segments and the backrest,
- wherein the seat surface segments are arranged in a side-by-side relationship and constitute a seat surface,
- wherein the seat surface segments are individually adjustable between at least two different vertical positions relative to the seat frame,
- wherein the seat surface segments are lockable in different vertical positions,
- wherein the seat surface segments comprise release means for releasing the seat surface segments from a locked state,
- wherein the release means is configured to couple with a control means arranged remotely from the respective passenger seat device, and
- wherein the seat surface segments are spring-loaded in a vertical, upward direction, such that they are lowered from a neutral position into a use position when a passenger sits down on the passenger seat device.

16. The passenger seat device of claim 15,
- wherein the seat surface segments automatically arrest in the use position, and
- wherein the backrest comprises a plurality of backrest segments, which are arranged in a side-by-side relationship corresponding to the seat surface segments.

17. The passenger seat device of claim 16,
- comprising a plurality of seat belt anchor points, which are associated with individual seat surface segments and two groups of seat surface segments,
- wherein a first group of seat surface segments comprises a lower vertical use position than a second group of seat surface segments, and
- wherein the vertical use positions of the seat surface segments of the first group and of the second group are swapped selectively, periodically or in an alternating manner.

* * * * *